(12) United States Patent
Kagan et al.

(10) Patent No.: US 7,676,597 B2
(45) Date of Patent: Mar. 9, 2010

(54) HANDLING MULTIPLE NETWORK TRANSPORT SERVICE LEVELS WITH HARDWARE AND SOFTWARE ARBITRATION

(75) Inventors: Michael Kagan, Zichron Yaakov (IL); Diego Crupnicoff, Haifa (IL); Margarita Shnitman, Netivot (IL); Ariel Shachar, Haifa (IL); Dafna Levenvirth, Jerusalem (IL); Gil Bloch, Kiryat Ata (IL)

(73) Assignee: Mellanox Technologies Ltd., Yokneam (IL)

( * ) Notice: Subject to any disclaimer, the term of this patent is extended or adjusted under 35 U.S.C. 154(b) by 1462 days.

(21) Appl. No.: 10/052,435

(22) Filed: Jan. 23, 2002

(65) Prior Publication Data

US 2002/0150106 A1    Oct. 17, 2002

Related U.S. Application Data

(60) Provisional application No. 60/283,018, filed on Apr. 11, 2001.

(51) Int. Cl.
*G06F 15/173* (2006.01)

(52) U.S. Cl. ............. 709/240; 709/238; 709/250; 370/429

(58) Field of Classification Search .......... 709/250, 709/238, 240; 370/429
See application file for complete search history.

(56) References Cited

U.S. PATENT DOCUMENTS

| | | | | |
|---|---|---|---|---|
| 6,272,591 | B2 * | 8/2001 | Grun ..................... | 711/114 |
| 6,594,712 | B1 * | 7/2003 | Pettey et al. ............ | 710/22 |
| 6,687,757 | B1 * | 2/2004 | Ben-Ze'ev et al. ...... | 709/250 |
| 6,775,719 | B1 * | 8/2004 | Leitner et al. ........... | 710/33 |
| 6,831,916 | B1 * | 12/2004 | Parthasarathy et al. .... | 370/359 |
| 6,856,619 | B1 * | 2/2005 | Haugseth et al. ........ | 370/389 |
| 6,888,830 | B1 * | 5/2005 | Snyder, II et al. ....... | 370/392 |
| 6,912,604 | B1 * | 6/2005 | Tzeng et al. ............ | 710/52 |
| 6,948,004 | B2 * | 9/2005 | Gasbarro et al. ........ | 709/250 |

OTHER PUBLICATIONS

The InfiniBand Architecture Specification, Release 1.0, Oct. 2000. (Available at: www.infinibandta.org.).
The IBM PCI-X to InifiniBand Host Channel Adapter, Produced by IBM Microelectronics Division, Hopewell Junction, New York, Oct. 2000.

* cited by examiner

*Primary Examiner*—Hassan Phillips
*Assistant Examiner*—Glenford Madamba
(74) *Attorney, Agent, or Firm*—Mark M. Friedman

(57) ABSTRACT

An interface adapter for a packet network includes a first plurality of execution engines, coupled to a host interface so as to read from a memory work items corresponding to messages to be sent over the network, and to generate gather entries defining packets to be transmitted over the network responsive to the work items. A scheduling processor assigns the work items to the execution engines for generation of the gather entries. Switching circuitry couples the execution engines to a plurality of gather engines, which generate the packets responsive to the gather entries.

36 Claims, 4 Drawing Sheets

HANDLING MULTIPLE NETWORK TRANSPORT SERVICE LEVELS WITH HARDWARE AND SOFTWARE ARBITRATION

CROSS-REFERENCE TO RELATED APPLICATION

This application claims the benefit of U.S. Provisional Patent Application No. 60/283,018, filed Apr. 11, 2001. It is a continuation-in-part of a U.S. patent application entitled, "Network Interface Adapter with Shared Data Send Resources," filed Dec. 4, 2001. Both of these related applications are assigned to the assignee of the present patent application, and their disclosures are incorporated herein by reference.

FIELD OF THE INVENTION

The present invention relates generally to digital network communications, and specifically to network adapters for interfacing between a host processor and a packet data network.

BACKGROUND OF THE INVENTION

The computer industry is moving toward fast, packetized, serial input/output (I/O) bus architectures, in which computing hosts and peripherals are linked by a switching network, commonly referred to as a switching fabric. A number of architectures of this type have been proposed, culminating in the "InfiniBand™" (IB) architecture, which has been advanced by a consortium led by a group of industry leaders (including Intel, Sun Microsystems, Hewlett Packard, IBM, Compaq, Dell and Microsoft). The IB architecture is described in detail in the *InfiniBand Architecture Specification*, Release 1.0 (October, 2000), which is incorporated herein by reference. This document is available from the InfiniBand Trade Association at www.infinibandta.org.

A host processor (or host) connects to the IB fabric via a network interface adapter, which is referred to in IB parlance as a host channel adapter (HCA). Client processes running on the host communicate with the transport layer of the IB fabric by manipulating a transport service instance, known as a "queue pair" (QP), made up of a send work queue and a receive work queue. The IB specification permits the HCA to allocate as many as 16 million ($2^{24}$) QPs, each with a distinct queue pair number (QPN). A given client may open and use multiple QPs simultaneously. To send and receive communications over the network, the client initiates work requests (WRs), which causes work items, called work queue elements (WQEs), to be placed in the appropriate queues. The channel adapter then executes the work items, so as to communicate with the corresponding QP of the channel adapter at the other end of the link.

The QP that initiates a particular operation, i.e. injects a message into the fabric, is referred to as the requester, while the QP that receives the message is referred to as the responder. An IB operation is defined to include a request message generated by the requester and, as appropriate, its corresponding response generated by the responder. (Not all request messages have responses.) Each message consists of one or more IB packets. Typically, a given HCA will serve simultaneously both as a requester, transmitting requests and receiving responses on behalf of local clients, and as a responder, receiving requests from other channel adapters and returning responses accordingly. Request messages include, inter alia, remote direct memory access (RDMA) write and send requests and atomic read-modify-write operations, all of which cause the responder to write data to a memory address at its own end of the link, and RDMA read requests, which cause the responder to read data from a memory address and return it to the requester. Most response messages consist of a single acknowledgment packet, except for RDMA read responses, which may contain up to $2^{31}$ bytes of data, depending on the data range specified in the request.

Although IB does not explicitly define quality of service (QoS) levels, it provides mechanisms that can be used to support a range of different classes of service on the network. Each IB packet carries a Service Level (SL) attribute, indicated by a corresponding SL field in the packet header, which permits the packet to be transported at one of 16 service levels. The definition and purpose of each service level is not specified by the IB standard. Rather, it is left as a fabric administration policy, to be determined between each node and the subnet to which it belongs.

Different service levels can be mapped to different virtual lanes (VLs), which provide a mechanism for creating multiple virtual links within a single physical link. A virtual lane represents a set of transmit and receive buffers in a network port. The port maintains separate flow control over each VL, so that excessive traffic on one VL does not block traffic on another VL. The actual VLs that a port uses are configurable, and can be set based on the SL field in the packet. As a packet traverses the fabric, its SL determines which VL will be used on each link.

SUMMARY OF THE INVENTION

It is an object of some aspects of the present invention to provide devices and methods for interfacing a host processor to a network, while affording enhanced efficiency in utilizing device and network resources.

It is a further object of some aspects of the present invention to provide a network interface adapter that supports a large number of service levels, with easily-configurable service characteristics.

In preferred embodiments of the present invention, a host processor submits work requests (WRs), which cause work queue elements (WQEs) to be placed on multiple different queue pairs (QPs) serviced by a host channel adapter (HCA). Each of the QPs is assigned by the HCA to one of a plurality of schedule queues maintained by the HCA, wherein each schedule queue may correspond to a different class of service provided by the HCA. When a QP reaches the head of its schedule queue, a scheduler assigns the QP to one of an array of execution engines, based on programmable scheduling policies for each of the classes of service. The scheduler is preferably implemented as a software process running on an embedded processor in the HCA, but it may alternatively be implemented in hardware or as a combination of hardware and software elements.

The execution engines parse the WQEs to produce gather entries, which define the packets to be generated and the data to be read from the host memory in order to fulfill the corresponding WRs. The execution engines push the gather entries to an array of gather engines, which then read the data from the memory and produce the actual packets for transmission through one of the network ports of the HCA. Preferably, each of the gather engines is configurably connected to one of the ports, and the execution engines are coupled to respective gather engines depending on the port assignments of the QPs that the execution engines are servicing. Thus, multiple execution engines, servicing QPs on the same port, may be coupled to the same gather engine. One or more arbiters, preferably implemented as hardware switching elements, arbitrate among the execution engines coupled to each of the gather engines in order to pass the gather entries in turn to the gather engine. The arbitration is preferably weighted according to respective, programmable weight factors assigned to the execution engines and held in registers accessed by the arbiter. This hardware arbitration ensures that the gather engine resources are used efficiently, while also providing an additional point at which the priorities of the classes of service of the different schedule queues may be differentiated.

Thus, the novel combination of programmable software and hardware arbitration functions enables the network user to define and configure a large number of different service classes with ease and flexibility. In the IB context, these service classes are preferably coordinated with the 16 levels of service identified by the SL attribute in the packets created by the HCA, and with the mapping of these levels to virtual lanes (VLs). HCAs operating in accordance with preferred embodiments of the present invention, however, can be made to support more than 16 service classes, and can be used to control the relative priorities and service characteristics of the classes in ways that are not available on the network itself. Thus, in the context of the present patent application and in the claims, the term "classes of service" should be understood as referring generally to differentiated service characteristics that are applied by the HCA to different service instances, and specifically (in IB networks) to different QPs.

In some preferred embodiments of the present invention, further arbitration mechanisms control access by elements of the HCA to the host memory. An execution arbiter governs the priority of the execution engines in fetching WQEs for the respective QPs from the memory. A gather arbiter governs the priority of the gather engines in fetching data specified by the gather entries from the memory. These mechanisms allow further adjustment and diversification of the service classes to which the QPs are assigned.

Whereas preferred embodiments described herein make reference specifically to servicing WRs submitted by a local host processor serviced by the HCA, the structure and functionality of these embodiments may be applied in substantially the same manner to respond to RDMA read requests received by the HCA via the IB network from a remote requester. This sort of sharing of HCA data sending resources between host-initiated (requester) and remote-initiated (responder) packet flows is described in detail in the above-mentioned patent application entitled, "Network Interface Adapter with Shared Data Send Resources." Moreover, although the preferred embodiments described herein relate specifically to IB switch fabrics and to HCAs used with such fabrics, the principles of the present invention may similarly be applied, mutatis mutandis, to channel adapters of other types, such as target channel adapters (TCAs), as well as to network interface adapters used in packet networks of other types.

There is therefore provided, in accordance with a preferred embodiment of the present invention, an interface adapter for a packet network, including:

a memory interface, for coupling to a memory;

a first plurality of execution engines, coupled to the host interface so as to read from the memory work items corresponding to messages to be sent over the network, and to generate gather entries defining packets to be transmitted over the network responsive to the work items; and a scheduling processor, coupled to assign the work items to the execution engines for generation of the gather entries;

a second plurality of gather engines, which are adapted to generate the packets responsive to the gather entries; and switching circuitry, coupling the execution engines to the gather engines so as to submit the gather entries to the gather engines for generation of the packets responsive thereto.

Preferably, each of the work items belongs to a respective transport service instance among multiple transport service instances served by the adapter, and the scheduling processor is adapted to assign the work items to the execution engines by selecting the respective transport service instances for service. In a preferred embodiment, the transport service instances include queue pairs, and the work items include work queue elements.

Additionally or alternatively, for each of the transport service instances, the respective work items are maintained in a list in the memory, and the execution engines are configured so as to generate in succession the gather entries corresponding to the work items in the list maintained for the transport service instance selected by the scheduling processor.

Preferably, the scheduling processor is adapted to maintain a third plurality of scheduling queues in which are entered the transport service instances to which the work items belong, the scheduling queues having respective heads and tails, and to select the instances from the heads of the queues for assignment to the execution engines. Most preferably, the transport service instances are assigned to the scheduling queues according to the classes of services to which the corresponding transport services belong. Further preferably, the scheduling processor is adapted to determine the scheduling queues from which the transport service instances are to be assigned to the execution engines in accordance with a scheduling policy relating to the respective classes of service of the scheduling queues, and the switching circuitry is coupled to arbitrate among the execution engines so as to submit the gather entries to the gather engines in an order responsive to the classes of service.

Additionally or alternatively, the scheduling processor is further adapted to enter the transport service instances at the tails of the scheduling queues to which they are assigned when work items belonging to the transport service instances are written to the memory. Further additionally or alternatively, context information regarding each of the transport service instances is recorded in the memory, and the scheduling processor is adapted to maintain the scheduling queues by directing pointers in the context information of each of the instances, except the instances at the tails of the scheduling queues, to point to the context information of succeeding instances in the queues.

In a preferred embodiment, the adapter includes an execution access arbiter, coupled between the execution engines and the memory interface so as to control an order of access to the memory by the execution engines in reading the work items, responsive to the classes of service.

Preferably, the execution engines are adapted to generate multiple gather entries corresponding to a single one of the work items, each of the gather entries defining no more than a single packet to be generated by one of the gather engines.

Preferably, the work items include descriptors indicating data to be read from the memory for inclusion in the packets, and the gather engines are coupled to read the data from the memory by direct memory access (DMA). Most preferably, the messages include remote direct memory access (RDMA) requests, and the work items are written to the memory by a host processor submitting the requests. Additionally or alternatively, the messages include remote direct memory access (RDMA) responses, and the work items are written to the memory responsive to RDMA request packets received by the adapter via the network. Further additionally or alternatively, at least some of the messages include data to be read from the memory and sent to a recipient via the network, and the work items indicate the data to be sent.

In a preferred embodiment, the adapter includes a data access arbiter, coupled between the gather engines and the memory interface so as to control an order of access to the memory by the gather engines for reading the data, wherein the data access arbiter is programmable so as to give priority in the order of access to one or more of the gather engines responsive to the classes of service.

In a preferred embodiment, the scheduling processor includes a microprocessor, which is programmed by software code to select the transport service instances for assignment to the execution engines, and the switching circuitry includes one or more registers, containing respective weight factors associated with the execution engines, and one or more hardware logic circuits, coupled to arbitrate among the execution engines to submit the gather entries to each of the gather engines responsive to the weight factors. Preferably, the memory interface, execution engines, scheduling processor, gather engines and switching circuitry are included in a single integrated circuit chip.

Additionally or alternatively, the one or more hardware logic circuits include a respective arbiter circuit connected to each one of the second plurality of gather engines, and the arbiter circuit is coupled to arbitrate among the execution engines whose gather entries are to be submitted to the one of the gather engines connected thereto. Preferably, the scheduling processor is adapted to determine which of the execution engines are to submit the gather entries to each of the gather engines, and to assign the execution engines to submit the gather entries accordingly, and the arbiter circuit connected to each of the gather engines is coupled to arbitrate among the execution engines assigned thereto.

Preferably, the first plurality is greater than the second plurality. Further preferably, the packets generated by the gather engines are transmitted over the network at a given transmission speed of the network, and the first plurality and the second plurality are chosen so as to be capable of generating the packets at a speed greater than the given transmission speed.

There is also provided, in accordance with a preferred embodiment of the present invention, an interface adapter for a packet network, including:

a memory interface, for coupling to a memory, to which work items belonging to respective transport service instances are written, wherein the transport service instances are assigned to respective classes of service, and the work items indicate messages to be sent over the network using the transport service instances;

a plurality of execution engines, coupled to the memory interface so as to read the work items from the memory, and to generate gather entries defining packets to be transmitted over the network responsive to the work items;

a scheduling processor, adapted to maintain a multiplicity of scheduling queues corresponding to the classes of service, the scheduling queues having respective heads and tails, and further adapted to enter the transport service instances to which the work items belong in the scheduling queues according to the classes of service of the instances, and to select the instances from the heads of the queues for assignment to the execution engines for generation of the gather entries; and a send data unit, which is adapted to generate the packets responsive to the gather entries.

Preferably, for each of the transport service instances, the respective work items are maintained in a list in the memory, and the execution engines are configured so as to generate in succession the gather entries corresponding to the work items in the list maintained for the transport service instance selected by the scheduling processor.

Further preferably, the scheduling processor is adapted to enter the transport service instance in the scheduling queues responsive to a host processor having written to a doorbell address of the adapter.

There is additionally provided, in accordance with a preferred embodiment of the present invention, an interface adapter for a packet network, including:

a memory interface, for coupling to a memory, to which are written work items belonging to different transport service instances and corresponding to messages to be sent over the network;

a plurality of execution engines, which are adapted to process the work items so as to generate gather entries defining packets to be transmitted over the network, each such execution engine including:

a buffer for holding the work items to be processed by the execution engine, the buffer having a programmable watermark level;

an execute machine, coupled to read the work items from the buffer and to generate the gather entries responsive thereto; and a fetch machine, coupled to fetch the work items from the memory to the buffer responsive to a volume of the work items in the buffer having fallen below the watermark level;

a scheduling processor, coupled to assign the transport service instances to the execution engines for generation of the gather entries based on the work items belonging to the transport service instances; and one or more gather engines, which are adapted to generate the packets responsive to the gather entries.

Preferably, each of the transport service instances is associated with a respective class of service, and the watermark level in each of the execution engines is programmable responsive to the class of service of the transport service instances assigned to the execution engine.

There is further provided, in accordance with a preferred embodiment of the present invention, a method for communicating over a packet network, including:

receiving work items corresponding to messages to be sent over the network;

assigning each of the work items to one of a first plurality of execution engines;

generating gather entries using the assigned execution engines, the gather entries defining packets to be transmitted over the network responsive to the work items;

arbitrating among the first plurality of the execution engines so as to distribute the gather entries among a second plurality of gather engines; and generating the packets using the gather engines responsive to the gather entries.

There is moreover provided, in accordance with a preferred embodiment of the present invention, a method for communicating over a packet network, including:

receiving work items belonging to respective transport service instances, wherein the transport service instances are assigned to respective classes of service, and the work items indicate messages to be sent over the network using the transport service instances;

creating a multiplicity of scheduling queues corresponding to the classes of service, the scheduling queues having respective heads and tails;

entering the transport service instances to which the work items belong in the scheduling queues according to the classes of service of the instances;

selecting the instances at the heads of the queues to be assigned for service by a plurality of execution engines;

generating gather entries using the assigned execution engines, the gather entries defining packets to be transmitted over the network responsive to the work items; and generating the packets responsive to the gather entries.

There is furthermore provided, in accordance with a preferred embodiment of the present invention, a method for communicating over a packet network, including:

receiving work items corresponding to messages to be sent over the network;

assigning each of the work items to one of a plurality of execution engines, each of the execution engines having a buffer for holding the work items to be used in generating the gather entries, the buffer having a programmable watermark level;

reading the work items out of the buffer so as to generate gather entries defining packets to be transmitted over the network responsive to the work items;

fetching the work items into the buffer responsive to a volume of the work items in the buffer having fallen below the watermark level; and generating the packets responsive to the gather entries.

The present invention will be more fully understood from the following detailed description of the preferred embodiments thereof, taken together with the drawings in which:

DETAILED DESCRIPTION OF PREFERRED EMBODIMENTS

Figure 1:
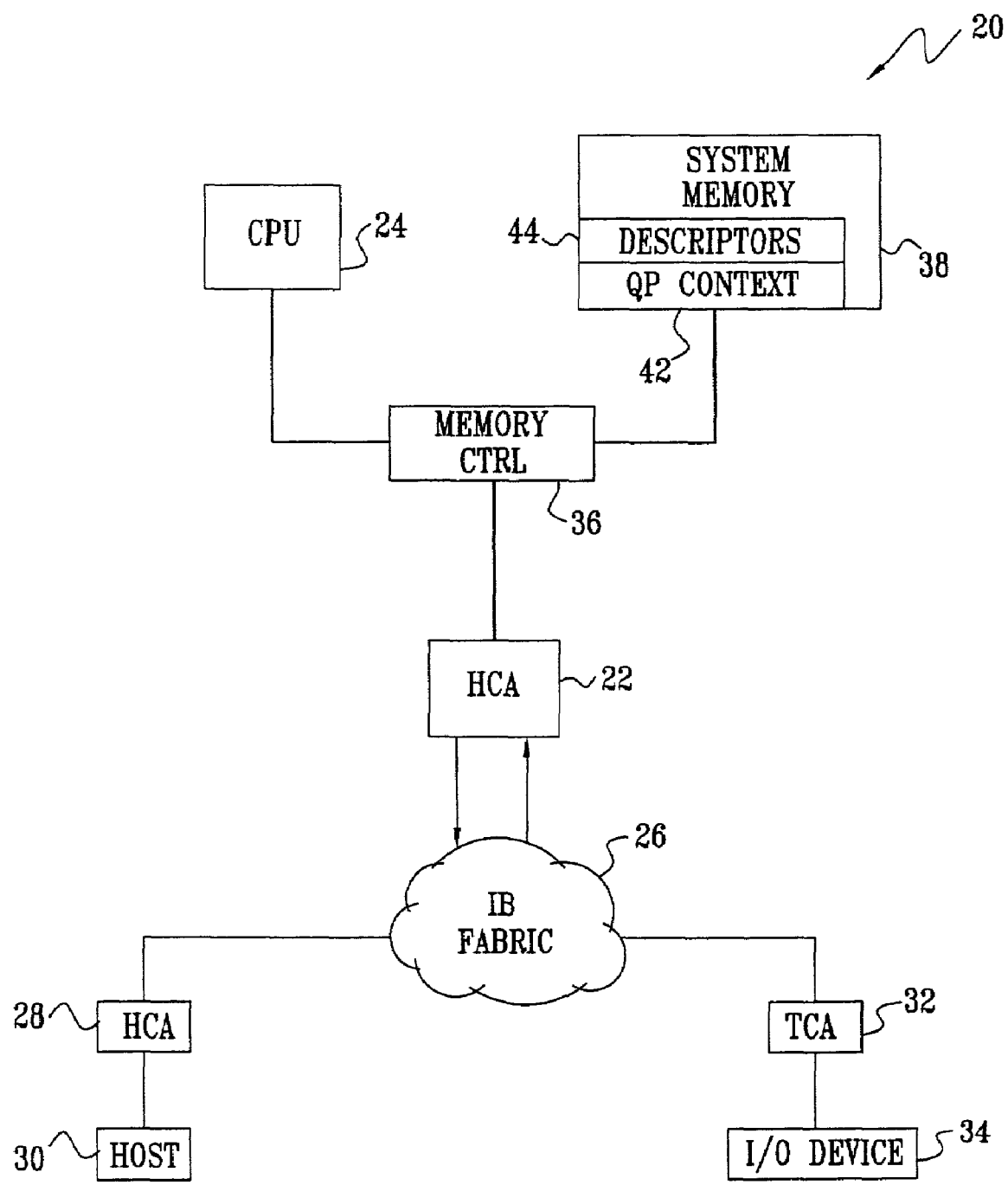
FIG. 1 is a block diagram that schematically illustrates a computer network, in accordance with a preferred embodiment of the present invention.

FIG. 1 is a block diagram that schematically illustrates an IB network communication system 20, in accordance with a preferred embodiment of the present invention. In system 20, a HCA 22 couples a host processor 24 to an IB network (or fabric) 26. Typically, processor 22 comprises an Intel Pentium™ processor or other general-purpose computing device with suitable software. HCA 22 typically communicates via network 26 with other HCAS, such as a remote HCA 28 with a remote host 30, as well as with TCAs, such as a TCA 32 connected to an input/output (I/O) device 34.

Host 24 and HCA 22 are connected to a system memory 38 via a suitable memory controller 36, as is known in the art. The HCA and memory typically occupy certain ranges of physical addresses in a defined address space on a bus connected to the controller, such as a Peripheral Component Interface (PCI) bus. In addition to the host operating system, applications and other data (not shown), memory 38 holds data structures that are accessed and used by HCA 22. These data structures preferably include QP context information 42 maintained by the HCA, and descriptors 44 corresponding to WQEs to be carried out by HCA 22. Certain aspects of the structure and use of QP context information 42 are described in greater detail in a U.S. patent application entitled "Multiple Queue Pair Access with a Single Doorbell," filed Nov. 26, 2001. Descriptors 44 are preferably prepared and executed in the form of a linked list, as described in another U.S. patent application entitled "DMA Doorbell," filed May 31, 2001. Both of these applications are assigned to the assignee of the present patent application, and their disclosures are incorporated herein by reference.

Figure 2:
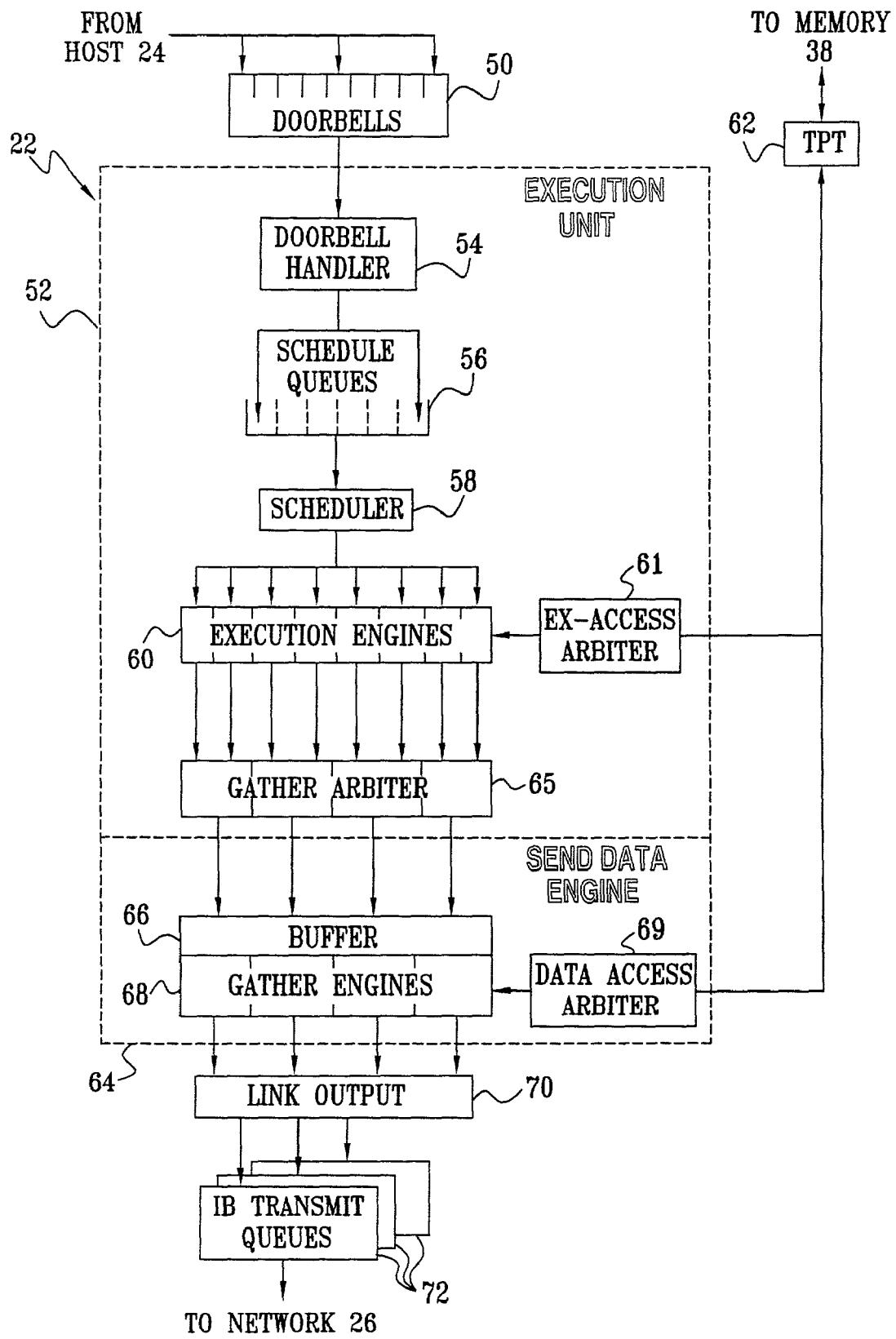
FIG. 2 is a block diagram that schematically shows details of a HCA, in accordance with a preferred embodiment of the present invention.

FIG. 2 is a block diagram that schematically shows details of HCA 22, in accordance with a preferred embodiment of the present invention. The blocks shown in the figure are those associated with servicing WRs submitted by host 24. For the sake of simplicity, elements of HCA 22 that are not essential to an understanding of the present invention are omitted. The blocks and links that must be added will be apparent to those skilled in the art. Further details of the HCA are described in the above-mentioned patent application entitled, "Network Interface Adapter with Shared Data Send Resources." That application also describes how the HCA data sending elements shown in FIG. 2 of the present patent application can be used to generate not only host-initiated (requester) packet flows, as described hereinbelow, but also responder packet flows in response to requests received via network 26, such as RDMA read requests from host 30.

The various blocks that make up HCA 22 may be implemented either as hardware circuits or as software processes running on a programmable processor, or as a combination of hardware- and software-implemented elements. Although certain functional elements of HCA 22 are shown as separate blocks in the figure for the sake of conceptual clarity, the functions represented by these blocks may actually be carried out by different software processes on a single processor. Preferably, all of the elements of the HCA are implemented in a single integrated circuit chip, but multi-chip implementations are also within the scope of the present invention.

In order to send out packets from HCA 22 on a given QP over network 26, host 24 posts WRs for the QP by writing descriptors 44 in memory 38 (FIG. 1). For RDMA write and send requests, the descriptors indicate the source of the data to be sent and its destination. The data source information typically includes a "gather list," pointing to the locations in memory 38 from which the data in the outgoing message are to be taken. After host 24 has prepared one or more descriptors, it "rings" a doorbell 50 of HCA 22, by writing to a corresponding doorbell address occupied by the HCA in the address space on the host bus. The doorbell thus serves as an interface between host 24 and HCA 22. The process of ringing and servicing doorbell 50 is described in detail in the above-mentioned patent applications.

An execution unit 52 in HCA 22 handles the WQEs that are generated by host 24. When the host process rings its assigned doorbell 50, a doorbell handler 54 enters the corresponding QP in one of a plurality of schedule queues 56 that it maintains. Each QP is preferably assigned in advance to a certain schedule queue, and the assignment is recorded in QP context 42 (FIG. 1). Each of queues 56 can have a different class of service, or priority level, and the assignment of the QPs to one of the schedule queues most preferably depends on the service class assigned to the QP. In a preferred embodiment, execution unit 52 supports sixty-four schedule queues, enabling a user of HCA 22 to define sixty-four different service classes.

A scheduler 58 arbitrates among schedule queues 56 in accordance with the assigned service classes. The arbitration process is described in detail hereinbelow with reference to FIG. 3. Preferably, for each queue 56, scheduler 58 holds in its memory only a pointer to the first QP in the queue. The remaining QPs are held in a "virtual queue," created by setting a next-QP pointer in QP context 42 of each QP in the schedule queue to point to the next QP in the queue. A new QP is added to an existing schedule queue by setting the next-QP pointer in the last QP in the queue to point to the new QP. Thus, the schedule queue itself uses only a minimal amount of memory no matter how long it is. Preferably, for efficiency of execution, some or all of the QP context information for QPs in the schedule queues is held in a cache memory in HCA 22 (not shown in the figures).

Each QP that the scheduler selects for service is passed to one of an array of execution engines 60, preferably comprising between sixteen and sixty-four such engines, implemented as hardware logic units. Typically, high-priority schedule queues are assigned to an execution engine immediately, as soon as a new QP is entered in the schedule queue for service. Thus, multiple QPs in a single schedule queue may even be serviced by multiple, respective execution engines simultaneously. On the other hand, lower-priority schedule queues must typically wait and share execution engines.

The assigned execution engine fetches the WQEs of the selected QP from memory 38. Access to the memory is controlled by a translation protection table (TPT) 62, which serves as a further element of the host interface of HCA 22, performing address translation and protection checks. An execution access arbiter 61 determines the order in which the execution engines access memory 38, since multiple execution engines may attempt to fetch their WQEs simultaneously. Further details of the execution engines and the processes by which they fetch and process WQEs are described below with reference to FIG. 4.

Execution engine 60 parses each WQE in order to prepare gather entries to submit to a send data engine (SDE) 64. Each gather entry defines a specific piece of header or payload data for inclusion in a packet to be prepared and sent out by the SDE. For RDMA write and send requests, as well as read responses, some of the gather entries include a pointer to the data in memory 38 that are to be included in the packet payload. (Other types of packets do not require the SDE to gather data from the memory.) A single WQE specifying a large volume of data to transmit is preferably broken up by the execution engine into multiple gather entries. In this way, each gather entry requires the SDE to perform no more than a single memory read (and thus results in generation of no more than a single packet).

Gather entries that specify the contents of packet header fields typically include the above-mentioned IB service level (SL) field. (These gather entries are generally of the "immediate" type, meaning that they already contain the data for the SDE to place in the packet and do not require a memory read.) The SL attribute for each QP is held in QP context 42. Different QPs that are assigned to the same schedule queue 56 may or may not have the same SL value. Thus, the user has the option of setting the SL attribute to accord with the relative priority level of the schedule queue to which a QP is assigned, or to set the SL and schedule queue assignments independently, so as to differentiate still further the classes of service provided on network 26.

Gather entries generated by execution engines 60 are pushed by gather arbiters 65 to an array of gather engines 68 in SDE 64. Preferably, the SDE comprises between two and eight gather engines, implemented in high-speed hardware logic, with one gather arbiter 65 for each of the gather engines. A buffer 66 is provided to hold the gather entries awaiting execution, when necessary. For each entry, the gather engine retrieves the data indicated by the entry from memory 38 by direct memory access (DMA) and loads the data into the packet. It then passes the packet to a channel adapter link output 70, which performs link layer functions and submits the packet to one of IB transmit queues 72 for transmission over network 26.

A data access arbiter 69 controls access by gather engines 68 to memory 38. Arbiter 69 actually performs two stages of arbitration for each gather entry that requires data to be read from the memory: first, to access TPT 62 in order to translate the virtual memory address specified in the gather entry to the corresponding physical address in memory 38, and then to actually access the specified memory location. Both data access arbiter 69 and execution arbiter 61, described above, are preferably programmable to give preference to certain gather engines 68 and/or execution engines 60, thereby ensuring that high-priority QPs assigned to these gather engines and execution engines are processed without delay.

In addition to providing mechanisms for differentiating classes of service, the use of multiple execution engines 60 and multiple gather engines 68 in HCA 22 is meant to ensure that the HCA takes full advantage of the wire speed of network 26. Preferably, the number of execution engines 60 is greater than the number of gather engines 68, and the processing bandwidth of execution unit 52 generally is greater than that of SDE 64, in order to ensure that as long as there are work items waiting to be serviced, buffer 66 is filled with gather entries. By the same token, the number and processing bandwidth of gather engines 68 is sufficient to ensure that IB transmit queues 72 are kept full and do not empty out due to processing bottlenecks in the HCA.

Figure 3:
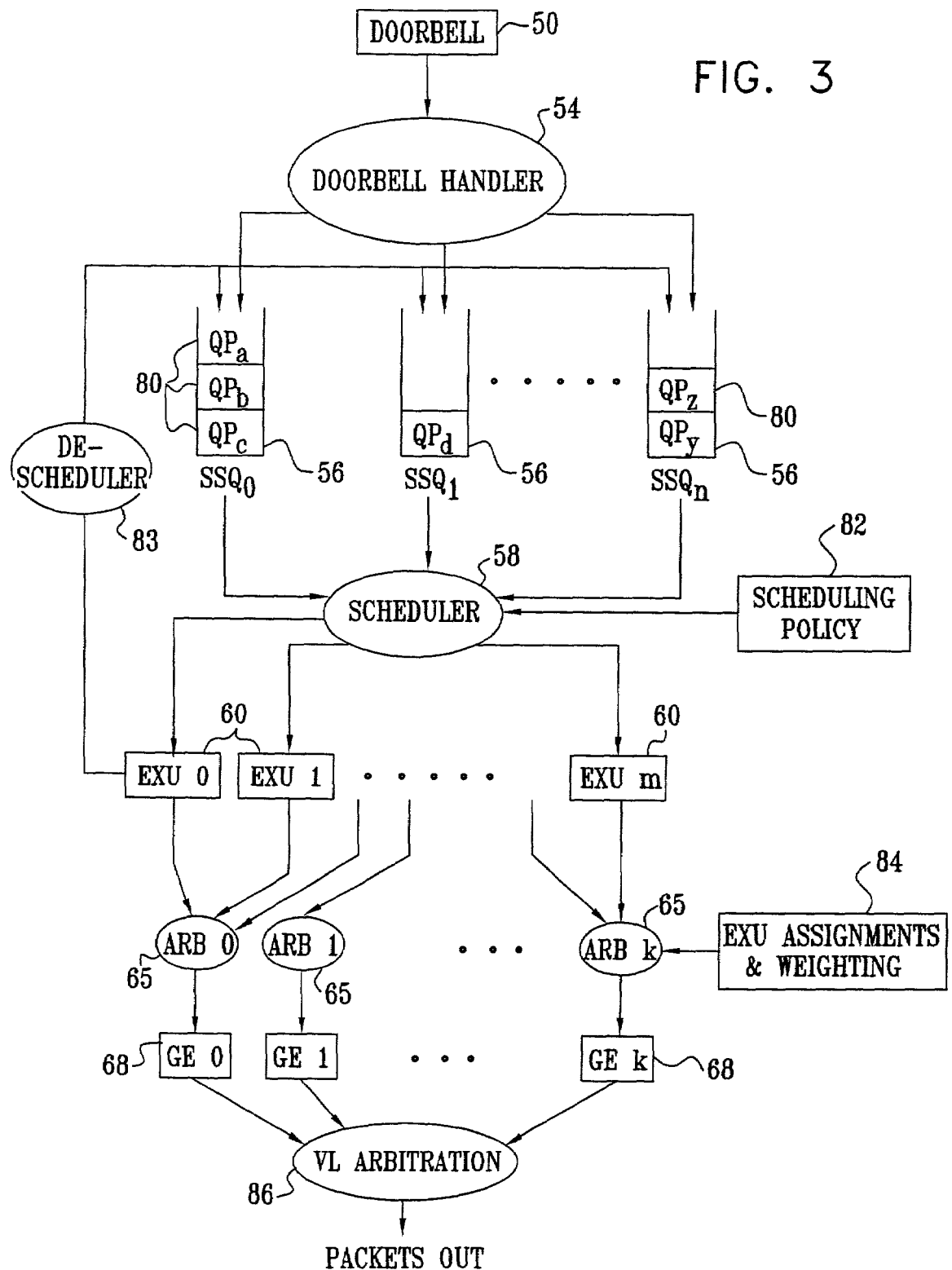
FIG. 3 is a block diagram that schematically illustrates data flow in the HCA of FIG. 2, in accordance with a preferred embodiment of the present invention.

FIG. 3 is a block diagram that provides a functional view of data flow in HCA 22, in accordance with a preferred embodiment of the present invention. The figure illustrates a three-stage scheduling/arbitration process applied by the HCA to WQEs generated by host 24:

1. Assignment of QPs in schedule queues 56 to execution engines (EXUs) 60 by scheduler 58.
2. Arbitration among execution engines 60 by gather arbiters (ARBs) 65, to assign the gather entries to gather engines (GEs) 68.
3. Virtual lane (VL) arbitration by a VL arbiter 86 to pass the packets generated by gather engines 68 to the HCA output link.

Preferably, a similar process, using substantially the same hardware elements and similar software, is applied in preparing and transmitting RDMA read responses to remote requesters.

In the example shown in this figure, it is assumed that host 24 submits WRs on multiple queue pairs, labeled arbitrarily QPa, QPb, . . . , QPz, which are assigned to schedule queues 56. A schedule queue entry 80, preferably a "virtual entry," as described above, is enqueued by doorbell handler 54 for each QP on which a WR is submitted. Depending on the respective classes of service to which these QPs belong, doorbell handler 54 distributes the corresponding QPs among schedule queues labeled SSQ0, SSQ1, . . . , SSQn. Scheduler 58 assigns the schedule queues to execution engines 60 according to scheduling policies 82 that are determined by the classes of service of the queues. Preferably, the functions of doorbell handler 54 and scheduler 58 are carried out by software processes running on an embedded processor comprised in execution unit 52. The scheduling policies can be programmed flexibly by the user to assign certain schedule queues to particular execution engines, as well as attaching different priority weights to the queues.

When one of execution engines 60 is assigned to service a given schedule queue, it begins processing the outstanding WQEs of the QP that is at the head of the schedule queue (for example, QPc in SSQ0, or QPy in SSQn). The execution engine continues to process the WQEs of this QP until one of the following conditions occurs:

No more outstanding WQEs remaining to be executed in the QP send queue.

No HCA resources available to execute the next WQE.

Occurrence of a QP-specific condition or error that prevents execution.

Scheduler preemption by a higher-priority service.

A scheduler policy limit has been reached for this QP, such as the number of requests executed, packets or bytes sent, or time elapsed.

When the stop condition is reached, execution engine 60 records all changes in the corresponding QP data structures in memory 38, waits for outstanding packets to be actually sent by gather engines 68, and then reports to scheduler 58 that it is idle and ready to receive a new QP assignment. At this stage, if the stopped QP has any WQEs still outstanding, a descheduler process 83 places the QP at the end of the respective schedule queue for future reassignment to one of the execution engines.

Arbiters 65 are preferably implemented as hardware switching elements, each of which passes the gather entries from execution engines 60 to a respective gather engine 68. Each of the gather engines is connected to one of the ports to network 26 that are accessed via link output 70. The port connections of the gather engines are configurable by setting appropriate register values, but they are generally fixed during the normal operation of HCA 22. Each of the QPs serviced by the HCA is assigned to one of the network ports, and these assignments are recorded as part of QP context 42 (FIG. 1). Therefore, when scheduler 58 passes a given QP for service to one of execution engines 60, it instructs the execution engine to pass its gather entries to a certain one of gather engines 68 that is connected to the appropriate port for this QP. Thus, multiple execution engines, servicing QPs on the same port, are typically coupled to the same gather engine, as shown in FIG. 3. The number of gather engines 68 in HCA 22 is preferably greater than the number of ports, so that multiple gather engines are typically connected to the same port. Preferably, scheduler 58 assigns the execution engines to pass their gather entries to the gather engines in such a way as to ensure that high-priority QPs receive the most rapid service possible.

Arbiters 65 perform weighted arbitration among the execution units feeding them, based on assignments and weighting factors 84 stored by HCA 22 in a respective register, accessible to arbiter 65. The gather engine assignments and weighting factors 84 applied to the execution engines then have the effect of controlling the relative priorities of the schedule queues and QPs.

Finally VL arbitration by VL arbiter 86 associates the outgoing packets generated by the gather engines with particular virtual lanes in network 26 and arbitrates among the virtual lanes for access to the physical link that connects HCA 22 to the network. The VL assignment of each packet is based on the SL attribute of the packet and on other decision factors, as provided by the IB specification.

Figure 4:
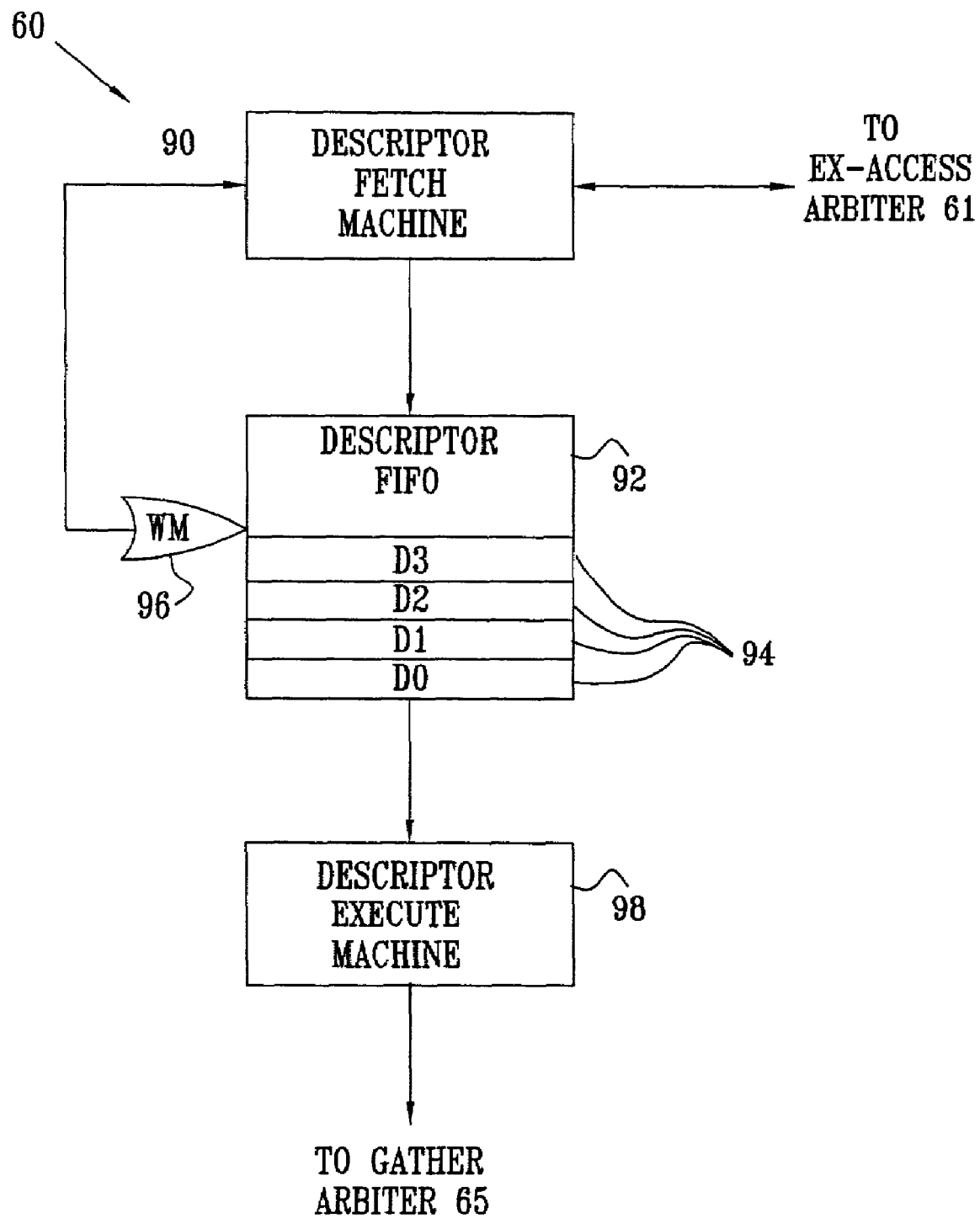
FIG. 4 is a block diagram that schematically shows details of an execution engine used in the HCA of FIG. 2, in accordance with a preferred embodiment of the present invention.

FIG. 4 is a block diagram that schematically shows details of execution engine 60, in accordance with a preferred embodiment of the present invention. A descriptor fetch machine 90 reads descriptors 44 from memory 38 via execution access arbiter 61 and inserts the descriptors as entries 94 in a descriptor first-in-first-out (FIFO) buffer 92. A descriptor execute machine 98 processes entries 94 in sequence from buffer 92 to generate gather entries, which are passed via the appropriate gather arbiter 65 to gather engine 68, as described above.

A programmable watermark 96 is used to control the fill level of buffer 92. Fetch machine 90 attempts to read further descriptors 44 from memory 38 only when the volume of descriptor data in buffer 92 falls below the watermark. For execution engines servicing high-priority QPs, watermark 96 is preferably set to a high level, so that buffer 92 will be kept filled, and execute machine 98 will not become idle until all of the outstanding WQEs for the QP have been executed. To service lower-priority QPs, however, watermark 96 may be set to a low level, in order to reduce the relative demand of the corresponding execution engine on execution access arbiter 61.

Although preferred embodiments are described herein with reference to a particular network and hardware environment, including IB switch fabric 26 and bus 36, the principles of the present invention may similarly be applied to networks and data connections of other types. Moreover, although these preferred embodiments relate specifically to HCA 22, some of the features of the HCA may also be implemented, mutatis mutandis, in channel adapters of other types, such as target channel adapters (TCAs), as well as in network interface adapters used in other packet networks. Therefore, the use, in the present patent application and in the claims, of certain terms that are taken from the IB specification to describe network devices, and specifically to describe HCAs, should not be understood as implying any limitation of the claims to the context of InfiniBand. Rather, these terms should be understood in their broad meaning, to cover similar aspects of network interface adapters that are used in other types of networks and systems.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An interface adapter for a packet network, comprising:

a memory interface, for coupling to a memory;

a first plurality of execution engines, coupled to the memory interface so as to read from the memory work items corresponding to messages to be sent over the network, and to generate gather entries defining packets to be transmitted over the network responsive to the work items, each work item belonging to a respective transport service instance among multiple transport service instances served by the adapter;

a scheduling processor, adapted to receive the transport service instances from a host of the interface adapter and to enter each transport service instance in a respective one of a multiplicity of scheduling queues according to a respective class of service of the each transport service instance, and coupled to assign the work items to the execution engines, for reading the work items from the memory and for generation of the gather entries, by selecting the respective transport service instances for service from the scheduling queues in accordance with the respective classes of service of the transport service instances;

a second plurality of gather engines, which are adapted to generate the packets responsive to the gather entries; and switching circuitry, coupling the execution engines to the gather engines so as to submit the gather entries to the gather engines for generation of the packets responsive thereto.

2. An adapter according to claim 1, wherein the transport service instances comprise queue pairs, and wherein the work items comprise work queue elements.

3. An adapter according to claim 1, wherein for each of the transport service instances, the respective work items are maintained in a list in the memory, and wherein the execution engines are configured so as to generate in succession the gather entries corresponding to the work items in the list maintained for the transport service instance selected by the scheduling processor.

4. An adapter according to claim 1, wherein the scheduling queues have respective heads and tails, and wherein the scheduling processor is adapted to select the instances from the heads of the queues for assignment to the execution engines.

5. An adapter according to claim 1, wherein the scheduling processor is adapted to determine the scheduling queues from which the transport service instances are to be assigned to the execution engines in accordance with a scheduling policy relating to the respective classes of service of the scheduling queues.

6. An adapter according to claim 5, wherein the switching circuitry is coupled to arbitrate among the execution engines so as to submit the gather entries to the gather engines in an order responsive to the classes of service.

7. An adapter according to claim 4, wherein the scheduling processor is further adapted to enter the transport service instances at the tails of the scheduling queues to which they are assigned when work items belonging to the transport service instances are written to the memory.

8. An adapter according to claim 4, wherein context information regarding each of the transport service instances is recorded in the memory, and wherein the scheduling processor is adapted to maintain the scheduling queues by directing pointers in the context information of each of the instances, except the instances at the tails of the scheduling queues, to point to the context information of succeeding instances in the queues.

9. An adapter according to claim 1, wherein the switching circuitry is coupled to arbitrate among the execution engines so as to submit the gather entries to the gather engines in an order responsive to the classes of service.

10. An adapter according to claim 1, wherein the switching circuitry is coupled to arbitrate among the execution engines so as to submit the gather entries to the gather engines in an order responsive to the classes of service.

11. An adapter according to claim 1, and comprising an execution access arbiter, coupled between the execution engines and the memory interface so as to control an order of access to the memory by the execution engines in reading the work items, responsive to the classes of service.

12. An adapter according to claim 1, wherein the execution engines are adapted to generate multiple gather entries corresponding to a single one of the work items, each of the gather entries defining no more than a single packet to be generated by one of the gather engines.

13. An adapter according to claim 1, wherein the work items comprise descriptors indicating data to be read from the memory for inclusion in the packets, and wherein the gather engines are coupled to read the data from the memory by direct memory access (DMA).

14. An adapter according to claim 13, wherein the messages comprise remote direct memory access (RDMA) requests, and wherein the work items are written to the memory by a host processor submitting the requests.

15. An adapter according to claim 13, wherein the messages comprise remote direct memory access (RDMA) responses, and wherein the work items are written to the memory responsive to RDMA request packets received by the adapter via the network.

16. An adapter according to claim 13, and comprising a data access arbiter, coupled between the gather engines and the memory interface so as to control an order of access to the memory by the gather engines for reading the data.

17. An adapter according to claim 16, wherein the data access arbiter is programmable so as to give priority in the order of access to one or more of the gather engines responsive to the respective classes of service of the transport service instances.

18. An adapter according to claim 1, wherein the scheduling processor comprises a microprocessor, which is programmed by software code to select the transport service instances for assignment to the execution engines, and wherein the switching circuitry comprises:

one or more registers, containing respective weight factors associated with the execution engines; and one or more hardware logic circuits, coupled to arbitrate among the execution engines to submit the gather entries to each of the gather engines responsive to the weight factors.

19. An adapter according to claim 18, wherein the memory interface, execution engines, scheduling processor, gather engines and switching circuitry are comprised in a single integrated circuit chip.

20. An adapter according to claim 18, wherein the one or more hardware logic circuits comprise a respective arbiter circuit connected to each one of the second plurality of gather engines, and wherein the arbiter circuit is coupled to arbitrate among the execution engines whose gather entries are to be submitted to the one of the gather engines connected thereto.

21. An adapter according to claim 20, wherein the scheduling processor is adapted to determine which of the execution engines are to submit the gather entries to each of the gather engines, and to assign the execution engines to submit the gather entries accordingly, and wherein the arbiter circuit connected to each of the gather engines is coupled to arbitrate among the execution engines assigned thereto.

22. An adapter according to claim 1, wherein the first plurality is greater than the second plurality.

23. An adapter according to claim 1, wherein the packets generated by the gather engines are transmitted over the network at a given transmission speed of the network, and wherein the first plurality and the second plurality are chosen so as to be capable of generating the packets at a speed greater than the given transmission speed.

24. An interface adapter for a packet network, comprising:
a memory interface, for coupling to a memory, to which work items belonging to respective transport service instances are written, wherein, the transport service instances are assigned to respective classes of service, and the work items indicate messages to be sent over the network using the transport service instances;

a plurality of execution engines, coupled to the memory interface so as to read the work items from the memory, and to generate gather entries defining packets to be transmitted over the network responsive to the work items;

a scheduling processor, adapted to maintain a multiplicity of scheduling queues corresponding to the classes of service, the scheduling queues having respective heads and tails, and further adapted to receive the transport service instances from a host of the interface adapter and to enter the transport service instances to which the work items belong in the scheduling queues according to the classes of service of the instances, and to select the instances from the heads of the queues for assignment to the execution engines for reading the work items from the memory and for generation of the gather entries; and a send data unit, which is adapted to generate the packets responsive to the gather entries.

25. An adapter according to claim 24, wherein the transport service instances comprise queue pairs, and wherein the work items comprise work queue elements.

26. An adapter according to claim 24, wherein for each of the transport service instances, the respective work items are maintained in a list in the memory, and wherein the execution engines are configured so as to generate in succession the gather entries corresponding to the work items in the list maintained for the transport service instance selected by the scheduling processor.

27. An adapter according to claim 24, wherein the scheduling processor is adapted to determine the scheduling queues from which the transport service instances are to be assigned to the execution engines in accordance with a scheduling policy relating to the respective classes of service of the scheduling queues.

28. An adapter according to claim 24, wherein the scheduling processor is further adapted to enter the transport service instances at the tails of the scheduling queues to which they are assigned when work items belonging to the transport service instances are written to the memory.

29. An adapter according to claim 28, wherein the scheduling processor is adapted to enter the transport service instance in the scheduling queues responsive to a host processor having written to a doorbell address of the adapter.

30. An adapter according to claim 24, wherein context information regarding each of the transport service instances is recorded in the memory, and wherein the scheduling processor is adapted to maintain the scheduling queues by directing pointers in the context information of each of the instances, except the instances at the tails of the scheduling queues, to point to the context information of succeeding instances in the queues.

31. An adapter according to claim 24, wherein the messages comprise remote direct memory access (RDMA) requests, and wherein the work items are written to the memory by a host processor submitting the requests.

32. An adapter according to claim 24, wherein the messages comprise remote direct memory access (RDMA) responses, and wherein the work items are written to the memory responsive to RDMA request packets received by the adapter via the network.

33. An adapter according to claim 24, wherein at least some of the messages comprise data to be read from the memory and sent to a recipient via the network, and wherein the work items indicate the data to be sent.

34. An adapter according to claim 24, and comprising an execution access arbiter, coupled between the execution engines and the memory interface so as to control an order of access to the memory by the execution engines in reading the work items, responsive to the classes of service.

35. An adapter according to claim 24, wherein each of the execution engines comprises:
 a buffer for holding the work items to be processed, the buffer having a programmable watermark level;
 an execute machine, coupled to read the work items from the buffer and to generate the gather entries corresponding thereto; and
 a fetch machine, coupled to fetch the work items from the memory to the buffer responsive to a volume of the work items in the buffer having fallen below the watermark level.

36. An adapter according to claim 35, wherein the watermark level is programmable responsive to the classes of service of the transport service instances assigned to each of the execution engines for generation of the corresponding gather entries.

* * * * *